United States Patent
Shintani (10) Patent No.: US 7,471,473 B2
(45) Date of Patent: Dec. 30, 2008

(54) LENS SUPPORT STRUCTURE, LENS BARREL, AND CAMERA

(75) Inventor: Dai Shintani, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/014,300

(22) Filed: Jan. 15, 2008

(65) Prior Publication Data

US 2008/0170306 A1    Jul. 17, 2008

(30) Foreign Application Priority Data

Jan. 17, 2007    (JP) .............................. 2007-008150

(51) Int. Cl.
G02B 7/02 (2006.01)
G03B 17/00 (2006.01)

(52) U.S. Cl. ...................... 359/819; 359/820; 359/811; 396/529

(58) Field of Classification Search ................. 359/811, 359/808, 819, 820, 356, 738, 785; 396/349, 396/529; 355/53, 67, 72–76; 250/310, 311, 250/353; 348/335; 438/373

See application file for complete search history.

(56) References Cited

U.S. PATENT DOCUMENTS

| | | | |
|---|---|---|---|
| 4,886,342 A * | 12/1989 | Kudo et al. | .................. 359/738 |
| 5,249,082 A | 9/1993 | Newman | |
| 6,388,826 B2 * | 5/2002 | Iikawa et al. | .................. 359/822 |
| 6,424,473 B1 * | 7/2002 | Nakane et al. | .............. 359/827 |
| 6,501,605 B2 * | 12/2002 | Moriya | ........................ 359/819 |
| 6,549,346 B2 | 4/2003 | Wada et al. | |
| 6,741,406 B2 * | 5/2004 | Kitamura et al. | ............ 359/819 |
| 7,218,462 B2 * | 5/2007 | Sudoh | ........................ 359/811 |
| 2005/0168846 A1 | 8/2005 | Ye et al. | |
| 2006/0158748 A1 | 7/2006 | Hirata et al. | |

FOREIGN PATENT DOCUMENTS

| | | |
|---|---|---|
| JP | 8-220408 | 8/1996 |
| JP | 9-281374 | 10/1997 |
| JP | 2004-246258 | 9/2004 |
| JP | 2004-264577 | 9/2004 |
| JP | 2005-134672 | 5/2005 |
| JP | 2006-201378 | 8/2006 |

* cited by examiner

Primary Examiner—Loha Ben
(74) Attorney, Agent, or Firm—McDermott Will & Emery LLP (57) ABSTRACT

A lens support structure includes a third lens 53, a fourth lens 54, a first frame 50, and an adhesive agent 58. The first frame 50 has a first portion 55 to which the third lens 53 is fitted and a second portion 56 where the second lens element is disposed inside the inner periphery thereof. The adhesive agent 58 fixes the fourth lens 54 to the first frame 50. The material of the fourth lens 54 has lower stiffness than the material of the third lens 53, or has a larger coefficient of linear expansion. A gap S is formed in the radial direction between the fourth lens 54 and the second portion 56. The inside diameter of the first portion 55 is different from the inside diameter of the second portion 56.

20 Claims, 8 Drawing Sheets

LENS SUPPORT STRUCTURE, LENS BARREL, AND CAMERA

CROSS-REFERENCE TO RELATED APPLICATIONS

This application claims priority to Japanese Patent Application No. JP2007-008150 filed on Jan. 17, 2007. The entire disclosures of Japanese Patent Application No. JP2007-008150 is hereby incorporated herein by reference.

BACKGROUND OF THE INVENTION

1. Field of the Invention

The present invention relates to a lens support structure, a lens barrel, and a camera, and more particularly relates to a lens support structure, a lens barrel, and a camera in which a plurality of lenses of different materials are supported.

2. Description of the Related Art

Digital cameras, which have become very popular in recent years, make use of a CCD (charge coupled device) or CMOS (complementary metal-oxide semiconductor) sensor or another such imaging element to convert an optical image into an electrical signal, and to digitize and record the electrical signal.

In the field of digital cameras, the main body needs to be made smaller to make the product easier to carry. More specifically, reducing the size of the lens barrel is believed to contribute greatly to reducing the size of the main body. One possible way to reduce the size of a lens barrel in the direction of its optical axis is to shorten the distance between the lenses.

There is a limit to the dimensional precision of a lens frame. Consequently, when a lens is positioned using the lens frame as a reference, there is a decrease in lens positioning precision.

In view of this, there has been proposed a lens support structure in which a plurality of lenses are brought into direct contact in the direction along the optical axis. A lens face is machined to a higher precision than a lens frame, and therefore, bringing lenses into direct contact allows the lens positioning precision to be increased and the distance between lenses to be shortened.

Meanwhile, optical systems such as these do not always use glass lenses, and plastic lenses are also employed with an eye toward manufacturing costs.

However, plastics and other such resins generally have lower stiffness and a larger coefficient of linear expansion than glass. Therefore, when a plastic lens is fitted into a lens frame with no gap, if the temperature should rise so that the outside diameter of the plastic lens increases, for example, the outer peripheral part of the plastic lens will be pressed by the lens frame, and as a result the plastic lens deforms and its optical performance degrades.

In view of this, a lens support structure in which a gap is ensured between the lens frame and the outer peripheral part of a plastic lens has been proposed in Japanese Laid-Open Patent Applications H8-220408 and H9-281374 in order to prevent degradation of optical performance.

As a result, a change in the outside diameter of the plastic lens caused by temperature change will be absorbed by the gap, so even if the temperature does change, optical performance will not degrade.

Nevertheless, with a conventional lens frame, the inside diameter of the portion that supports a glass lens is the same as the inside diameter of the portion where a plastic lens is disposed inside the inner periphery thereof. Therefore, the only time this structure can be used is when the outside diameter of the glass lens is greater than the outside diameter of the plastic lens. That is, when a plurality of lenses made of different materials are supported with a lens support structure such as this, there is a decrease in design freedom.

Also, the dimensions of a lens support portion are generally corrected to keep the gap in the radial direction between the lens support portion and the lens to a specific amount, or to dispose the lens coaxially.

With the above-mentioned lens support structure, however, since the inside diameters of the portions where the lenses are disposed are all the same, it is difficult to correct the lens support portion for each lens. As a result, there is the risk that dimensional precision of the lens support portion will decrease, and that optical performance will degrade.

Thus, when a plurality of lenses of different materials are supported, with a conventional lens support structure it is difficult to prevent degradation in the optical performance while increasing design freedom.

SUMMARY OF THE INVENTION

It is an object of the present invention to prevent the degradation of optical performance while increasing design freedom in a lens support structure that supports a plurality of lenses of different materials.

The lens support structure according to a first aspect of the present invention includes a first lens element, a second lens element, a support member, and an adhesive agent. The second lens element is made of a different material from that of the first lens element. The support member supports the first lens element and second lens element, and has a first portion to which the first lens element is fitted and a second portion where the second lens element is disposed inside the inner periphery thereof. The adhesive agent fixes the second lens element to the support member. The second lens element has lower stiffness than the first lens element, or has a larger coefficient of linear expansion than the first lens element. A gap is formed between the second lens element and the second portion in the radial direction. The inside diameter of the first portion is different from the inside diameter of the second portion.

With this lens support structure, because a gap is formed between the second lens element and the second portion in the radial direction, even when the second lens element has a larger coefficient of linear expansion than the first lens element, any change in the outside diameter of the second lens element brought about by temperature change will be absorbed by the gap, so there will be no interference between the outer peripheral part of the second lens element and the second portion. Specifically, deformation of the second lens element can be prevented, which in turn prevents the resulting degradation of optical performance.

In addition, because the inside diameter of the first portion is different from the inside diameter of the second portion with this lens support structure, even if the outside diameter of the first lens element is different from the outside diameter of the second lens element, the inside diameter of the first portion and the inside diameter of the second portion can be individually adjusted. Specifically, there is greater design freedom with this lens support structure than with a conventional lens support structure.

Thus, with this lens support structure, degradation of optical performance can be prevented while greater design freedom can be achieved.

The lens support structure according to a second aspect of the present invention is the lens support structure of the first aspect, wherein the outer peripheral part of the second lens element comes into contact with the outer peripheral part of the first lens element in the direction along an optical axis thereof.

The lens support structure according to a third aspect of the present invention is the lens support structure of the first or second aspect, wherein the support member further has at least one bonding groove formed on the inner peripheral part of the second portion and extending in the direction along the optical axis of the second lens element.

Here, the bonding groove may be formed in at least one part of the second portion in the direction along the optical axis, to the extent that the second lens element can be fixed in the second portion by the adhesive agent.

The lens support structure according to a fourth aspect of the present invention is the lens support structure of the third aspect, wherein the bonding groove extends in the direction along the optical axis up to the inner peripheral part of the first portion.

The lens support structure according to a fifth aspect of the present invention is the lens support structure of any one of the first to fourth aspects, wherein the first portion presses radially inwardly the outer peripheral part of the first lens element to the inside in the radial direction.

The lens support structure according to a sixth aspect of the present invention is the lens support structure of any one of the first to fifth aspects, wherein the support member further has a contact part formed to extend radially inwardly from either the first or second portion, and where the outer peripheral part of the first or second portion comes into contact in the direction along the optical axis.

The lens barrel according to a seventh aspect of the present invention is a lens barrel for supporting an imaging optical system, including the lens support structure according to any one of the first to sixth aspects, and a support frame. The support frame supports the support member rotatably around the optical axis of the imaging optical system and movably in the direction along the optical axis.

The camera according to a eighth aspect of the present invention includes the lens barrel according to any one of the first to seventh aspects, an imaging optical system, and a outer case. The imaging optical system is supported by the lens barrel. An imaging unit captures an optical image of a subject formed by the imaging optical system. The outer case supports the lens barrel.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

The lens barrel and camera according to the present invention will now be described with reference to the drawings.

1. Overview of Digital Camera

Figure 1:
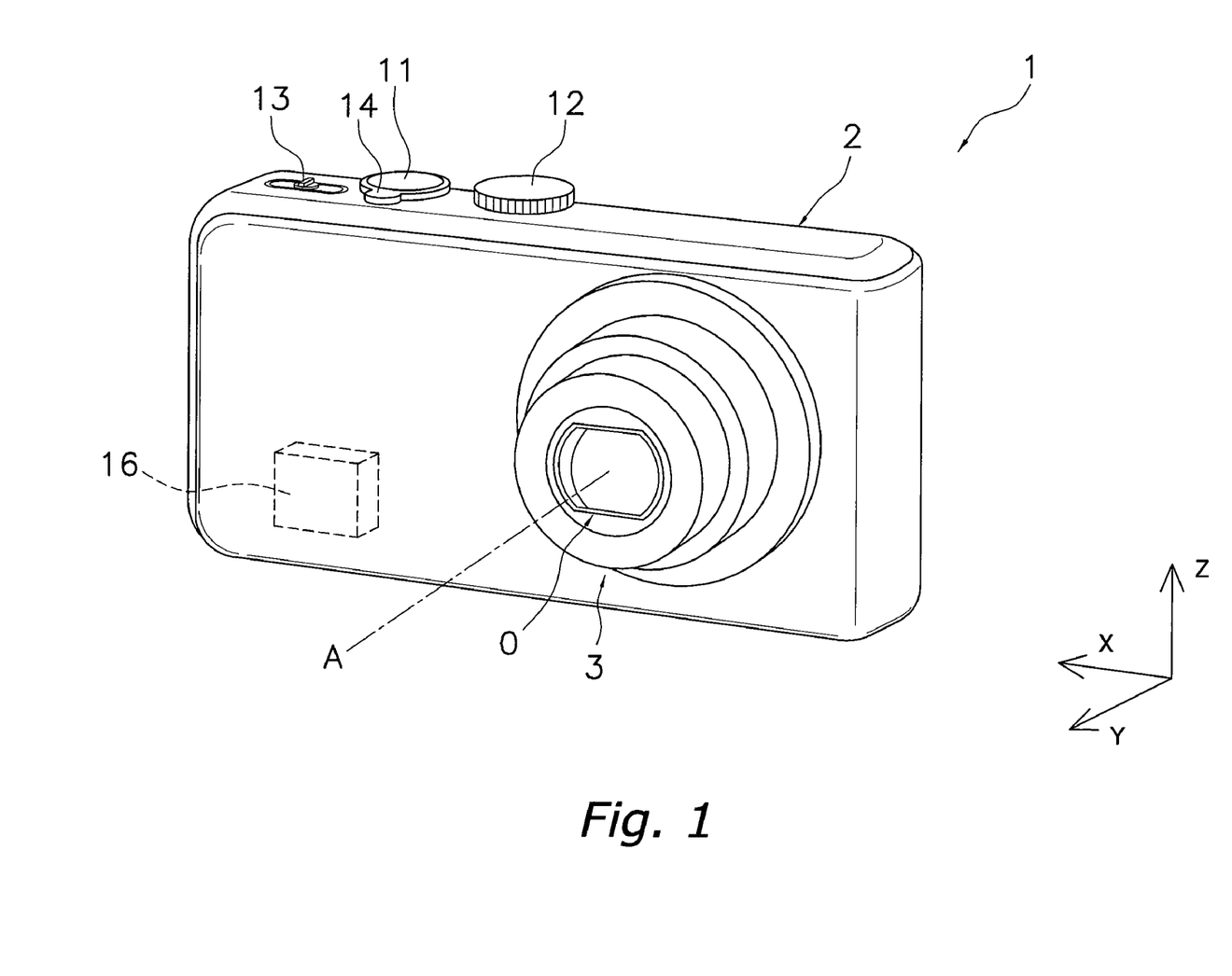
FIG. 1 is a schematic perspective view of a digital camera.
Figure 2:
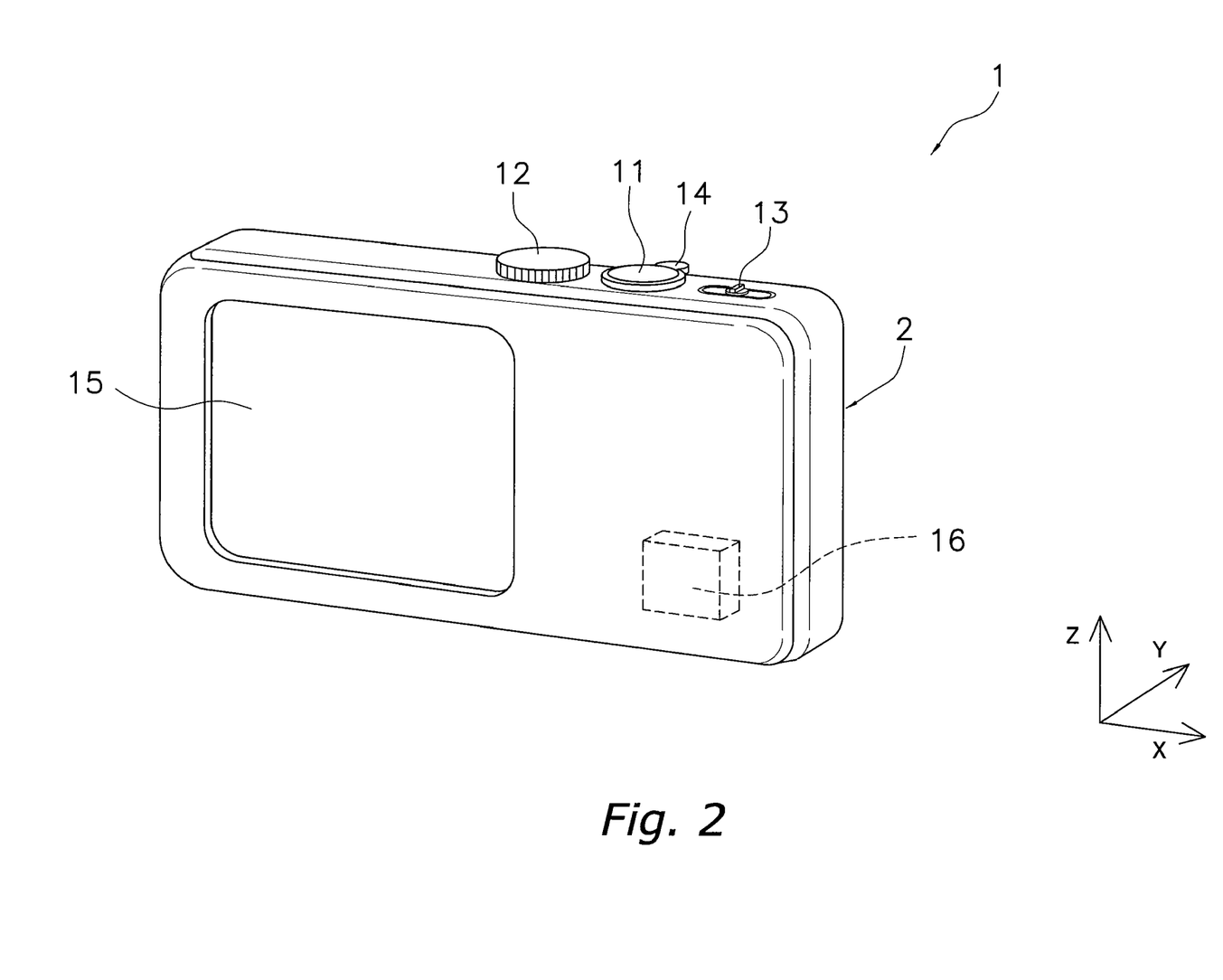
FIG. 2 is a schematic perspective view of a digital camera.

A digital camera 1 according to a preferred embodiment of the present invention will be described with reference to FIGS. 1 and 2. FIGS. 1 and 2 are schematic perspective views of the digital camera 1. FIG. 1 shows the situation when a lens barrel 3 is in an image capture state.

The digital camera 1 is a camera for acquiring an image of a subject. A multistage retractable lens barrel 3 is installed in the digital camera 1 in order to afford higher magnification and a more compact size.

In the following description, the six sides of the digital camera 1 are defined as follows.

The side that faces the subject when an image is captured with the digital camera 1 is called the front face, and the opposite side is called the rear face. When an image is captured such that the top and bottom of the subject in the vertical direction coincide with the short-side top and bottom of a rectangular image (generally with an aspect ratio (the ratio of the long side to the short side) of 3:2, 4:3, 16:9, etc.) captured by the digital camera 1, the side of the camera facing upward (vertically) is called the top face, and the opposite side is called the bottom face. Further, when an image is captured such that the top and bottom of the subject in the vertical direction coincide with the short-side top and bottom of a rectangular image captured by the digital camera 1, the side of the camera that is to the left when viewed from the subject side is called the left face, and the opposite side is called the right face. The above definitions are not intended to limit the orientation in which the digital camera 1 is used.

According to the above definitions, FIG. 1 is a perspective view of the front, top, and left faces.

In addition to the six sides of the digital camera 1, the six sides of the various constituent members disposed in the digital camera 1 are similarly defined. That is, the above definitions apply to the six sides of the various constituent members when they have been disposed in the digital camera 1.

Also, as shown in FIG. 1, there is defined a three-dimensional coordinate system (right-hand system) having a Y axis that is parallel to the optical axis A of an imaging optical system O (discussed below). With this definition, the direction from the rear face side toward the front face side along the optical axis A is the Y axis positive direction, the direction from the right face side toward the left face side perpendicular to the optical axis A is the X axis positive direction, and the direction from the bottom face side toward the top face side perpendicular to the X and Y axes is the Z axis positive direction.

This XYZ coordinate system will be referred to in the following description of the drawings. That is, the X axis positive direction, the Y axis positive direction, and the Z axis positive direction in the drawings indicate the same respective directions.

2. Overall Structure of a Digital Camera

As shown in FIGS. 1 and 2, the digital camera 1 mainly includes an outer case 2 that holds the various units, an imaging optical system O that forms an optical image of the subject, and a lens barrel 3 that movably supports the imaging optical system O.

The imaging optical system O is made up of a plurality of lens groups, and these lens groups are disposed in a state of being aligned in the Y axis direction. The lens barrel 3 has a multistage retractable configuration, and is supported by the outer case 2. The plurality of lens groups are supported by the lens barrel 3 to be relatively movable in the Y axis direction. The configuration of the lens barrel 3 will be described in detail below.

A CCD unit 21 serving as an imaging unit that subjects optical images to photoelectric conversion, and an image storing unit 16 that stores the images acquired by the CCD unit 21 are built into the outer case 2. A liquid crystal monitor 15 for displaying the images acquired by the CCD unit 21 is provided to the rear face of the outer case 2.

A shutter release button 11, a control dial 12, a power switch 13, and a zoom adjustment lever 14 are provided to the top face of the outer case 2 so that the user can capture images and perform other such operations. The shutter release button 11 is a button for inputting the exposure timing. The control dial 12 is a dial for making various settings related to image capture. The power switch 13 is used to switch the digital camera 1 on and off. The zoom adjustment lever 14 is used to adjust the zoom magnification, and can rotate over a specific angle range around the shutter release button 11.

FIGS. 1 and 2 show only the main configuration of the digital camera 1, and therefore components other than those discussed above may be provided to the digital camera 1.

3. Configuration of Lens Barrel

Figure 3:
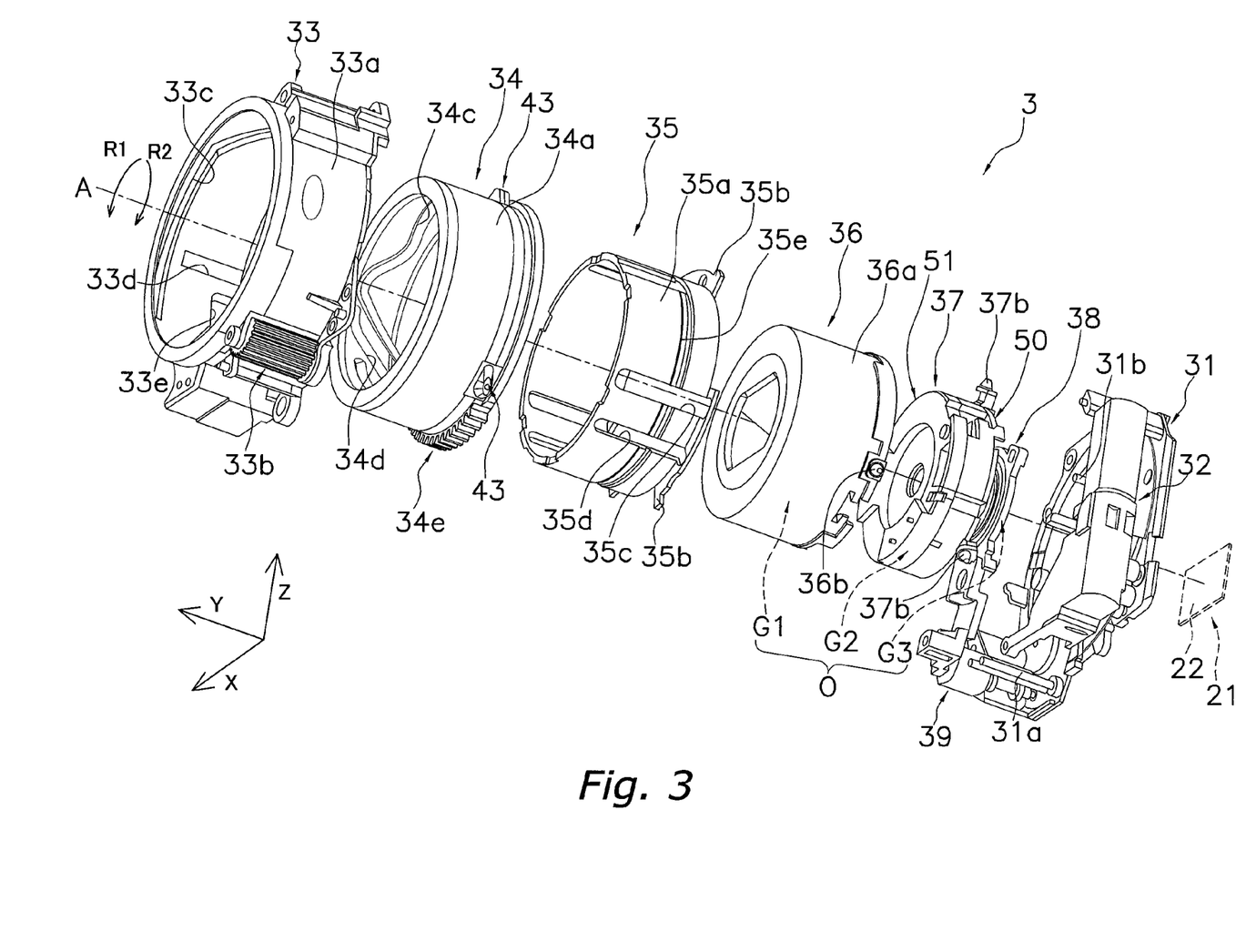
FIG. 3 is an exploded perspective view of a lens barrel.
Figure 4:
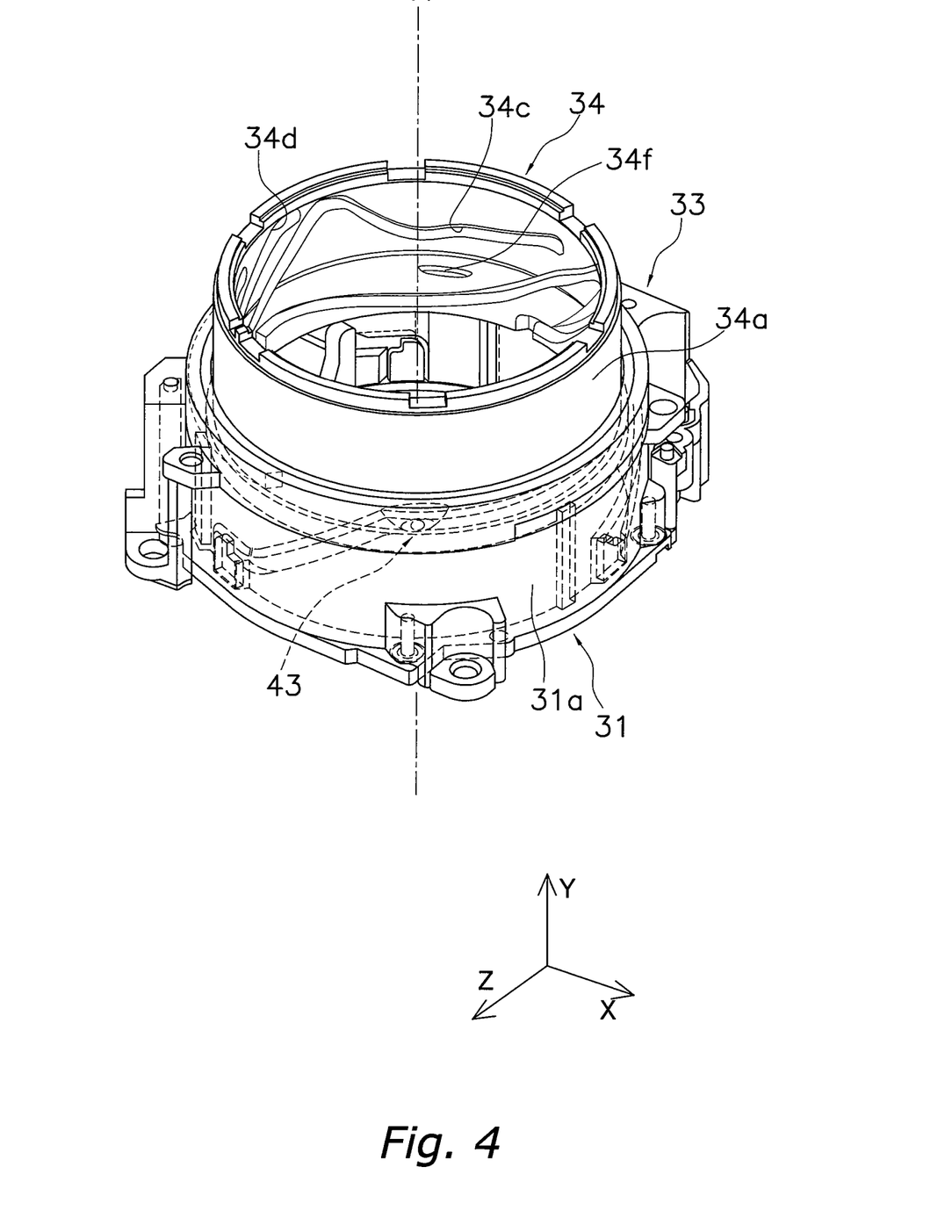
FIG. 4 is a schematic perspective view of a drive frame and a stationary frame.

The overall configuration of the lens barrel 3 will be described with reference to FIGS. 3 and 4. FIG. 3 is an exploded perspective view of the lens barrel 3, and FIG. 4 is a schematic perspective view of a drive frame and a stationary frame.

As shown in FIG. 3, the lens barrel 3 mainly includes a base plate 31 fixed to the outer case 2, a zoom motor 32 fixed to the base plate 31 and serving as a drive source, a stationary frame 33 that holds various frame members between itself and the base plate 31, a drive frame 34 to which the drive force of the zoom motor 32 is inputted, and a straight-movement frame 35 that is supported by the stationary frame 33 to be relatively movable in the Y axis direction. A CCD sensor 22 of the CCD unit 21 is attached to the base plate 31. An example of the zoom motor 32 is a stepping motor.

The lens barrel 3 further includes a first lens frame 36 that supports a first lens group G1, a second lens frame 37 that supports a second lens group G2, and a third lens frame 38 that supports a third lens group G3. The first lens group G1 is, for example, a lens group having negative power overall, and takes in light from the subject. The second lens group G2 is, for example, a lens group having positive power overall. The third lens group G3 is, for example, a lens group having positive power for adjusting the focal point. The imaging optical system O is made up of the first lens group G1, the second lens group G2, and the third lens group G3.

3.1. Stationary Frame

The stationary frame 33 is a member for guiding the drive frame 34, and makes up a member on the stationary side of the lens barrel 3 along with the base plate 31. The stationary frame 33 is fixed by screws to the base plate 31. The stationary frame 33 mainly includes a stationary frame main body 33a that makes up the main part, and a drive gear 33b that is rotatably supported by the stationary frame main body 33a.

The stationary frame main body 33a is fixed to the base plate 31, and the drive frame 34 is disposed inside the inner periphery thereof. The drive gear 33b is a member for transmitting the drive force of the zoom motor 32 to the drive frame 34, and meshes with a gear (not shown) of the zoom motor 32. Three cam grooves 33c for guiding the drive frame 34, and three straight-movement grooves 33d for guiding the straight-movement frame 35 are formed on the inner peripheral part of the stationary frame main body 33a. The cam grooves 33c are spaced equally in the circumferential direction. The straight-movement grooves 33d extend in the Y axis direction, and are spaced equally in the circumferential direction.

3.2. Drive Frame

The drive frame 34 is a member for guiding the first lens frame 36 and the second lens frame 37, and is disposed inside the inner periphery of the stationary frame 33. The drive frame 34 mainly includes a substantially cylindrical drive frame main body 34a that is disposed inside the inner periphery of the stationary frame main body 33a.

Three cam pins 43 are provided as cam members on the outer peripheral part of the drive frame main body 34a, and three first cam grooves 34c and three second cam grooves 34d are formed on the inner peripheral part. The first cam grooves 34c are grooves for guiding the first lens frame 36. The second cam grooves 34d are grooves for guiding the second lens frame 37. The three cam pins 43 are spaced equally in the circumferential direction, and engage with the three cam grooves 33c of the stationary frame 33. That is, the drive frame 34 is supported by the stationary frame 33 via the cam pins 43.

A gear portion 34e is formed on the outer peripheral part of the drive frame main body 34a. The gear portion 34e meshes with the drive gear 33b of the stationary frame 33. As a result, the drive force of the zoom motor 32 is transmitted through the drive gear 33b to the drive frame 34.

The drive frame 34 is driven around the optical axis A (the R1 direction and the R2 direction) by the drive force of the zoom motor 32. When the camera 1 changes from their retracted state to their image capture state, the drive frame 34 is driven to the R1 side by the zoom motor 32. As a result, the cam pins 43 move along the cam grooves 33c of the stationary frame 33, and the drive frame 34 moves to the Y axis direction positive side relative to the stationary frame 33. When the camera 1 changes from their image capture state to their retracted state, the drive frame 34 is driven to the R2 side by the zoom motor 32. As a result, the drive frame 34 moves to the Y axis direction negative side relative to the stationary frame 33.

Thus, the drive frame 34 is movable in the Y axis direction while rotating relative to the stationary frame 33, according to the shape of the cam grooves 33c.

3.3. Straight-Movement Frame

The straight-movement frame 35 is a member for preventing the rotation of the first lens frame 36 relative to the stationary frame 33, and is disposed inside the inner periphery of the drive frame 34. The straight-movement frame 35 mainly includes a cylindrical straight-movement frame main body 35a and three straight-movement pins 35b formed on the outer peripheral part of the straight-movement frame main body 35a.

The straight-movement pins 35b are disposed on the Y axis direction negative side of the straight-movement frame main body 35a so as not to interfere with the drive frame 34, and engage with the straight-movement grooves 33d in the stationary frame 33. That is, the straight-movement frame 35 is supported by the stationary frame 33 to be relatively straight movable in the Y axis direction.

A bayonet groove 35e is formed on the outer peripheral part of the straight-movement frame main body 35a. A bayonet tab 34f (see FIG. 4) formed on the inner peripheral part of the drive frame 34 engages with the bayonet groove 35e. This allows the straight-movement frame 35 to rotate relative to the drive frame 34 and to move integrally in the Y axis direction.

Specifically, when the drive frame 34 rotates relative to the stationary frame 33, the straight-movement frame 35 moves along with the drive frame 34 in the Y axis direction without rotating relative to the stationary frame 33 (while rotating relative to the drive frame 34).

Three first guide grooves 35c and three second guide grooves 35d that extend in the Y axis direction are formed in the straight-movement frame main body 35a. The three first guide grooves 35c are spaced equally in the circumferential direction, and the three second guide grooves 35d are spaced equally in the circumferential direction. Cam pins 36b (discussed below) of the first lens frame 36 are inserted in the first guide grooves 35c. Cam pins 37b (discussed below) of the second lens frame 37 are inserted in the second guide grooves 35d. That is, the rotation of the first lens frame 36 and the second lens frame 37 relative to the stationary frame 33 is restricted by the straight-movement frame 35. Furthermore, movement of the first lens frame 36 and the second lens frame 37 in the Y axis direction is not restricted by the first guide grooves 35c and the second guide grooves 35d.

3.4. First Lens Frame

The first lens frame 36 is a member for supporting the first lens group G1 to be relatively movable in the Y axis direction, and is disposed inside the inner periphery of the straight-movement frame 35. The first lens frame 36 mainly includes a first lens frame main body 36a in the interior of which is held the first lens group G1, and the three cam pins 36b provided on the outer peripheral part of the first lens frame main body 36a. The cam pins 36b are passed through the first guide grooves 35c and engage with the first cam grooves 34c of the drive frame 34.

When the drive frame 34 rotates relative to the stationary frame 33, the cam pins 36b move along the first cam grooves 34c. The movement of the cam pins 36b in the rotary direction here is restricted by the first guide grooves 35c of the straight-movement frame 35. Therefore, the cam pins 36b move only in the Y axis direction along the first cam grooves 34c and the first guide grooves 35c. Thus, the first lens frame 36 is movable in the Y axis direction relative to the drive frame 34 according to the shape of the first cam grooves 34c, without rotating relative to the stationary frame 33.

3.5. Second Lens Frame

The second lens frame 37 is a member for supporting the second lens group G2 to be relatively movable in the Y axis direction, and is disposed inside the inner periphery of the straight-movement frame 35 and on the Y axis direction negative side of the first lens frame 36. The second lens frame 37 mainly includes a first frame 50 and second frame 59 in the interior of which is held the second lens group G2, and the three cam pins 37b provided on the outer peripheral part of the first frame 50. The cam pins 37b are passed through the second guide grooves 35d and engage with the second cam grooves 34d of the drive frame 34.

When the drive frame 34 rotates relative to the stationary frame 33, the cam pins 37b move along the second guide grooves 35d. The movement of the cam pins 37b here in the rotational direction is restricted by the second guide grooves 35d of the straight-movement frame 35. Therefore, just as with the first lens frame 36, the cam pins 37b move only in the Y axis direction along the second cam grooves 34d and the second guide grooves 35d.

Thus, the second lens frame 37 is movable in the Y axis direction relative to the drive frame 34 according to the shape of the second cam grooves 34d, without rotating relative to the stationary frame 33.

3.6. Third Lens Frame

The third lens frame 38 is a member for supporting the third lens group G3 to be relatively movable in the Y axis direction, and is supported by focus shafts 31a and 31b of the base plate 31 to be relatively movable in the Y axis direction. The third lens frame 38 is driven by a focus motor 39 fixed to the base plate 31. The focus motor 39 moves the third lens frame 38 in the Y axis direction relative to the base plate 31.

3.7. Summary

To summarize the above configuration, the first lens frame 36 and the second lens frame 37 can be moved in the direction along the optical axis A by the zoom motor 32 via the stationary frame 33, the drive frame 34, and the straight-movement frame 35. The third lens frame 38 can be moved in the direction along the optical axis A by the focus motor 39.

Therefore, this configuration results in a retractable lens barrel 3 that allows adjustment of the focus and the zoom magnification of the imaging optical system O.

4. Lens Support Structure

Figure 5:
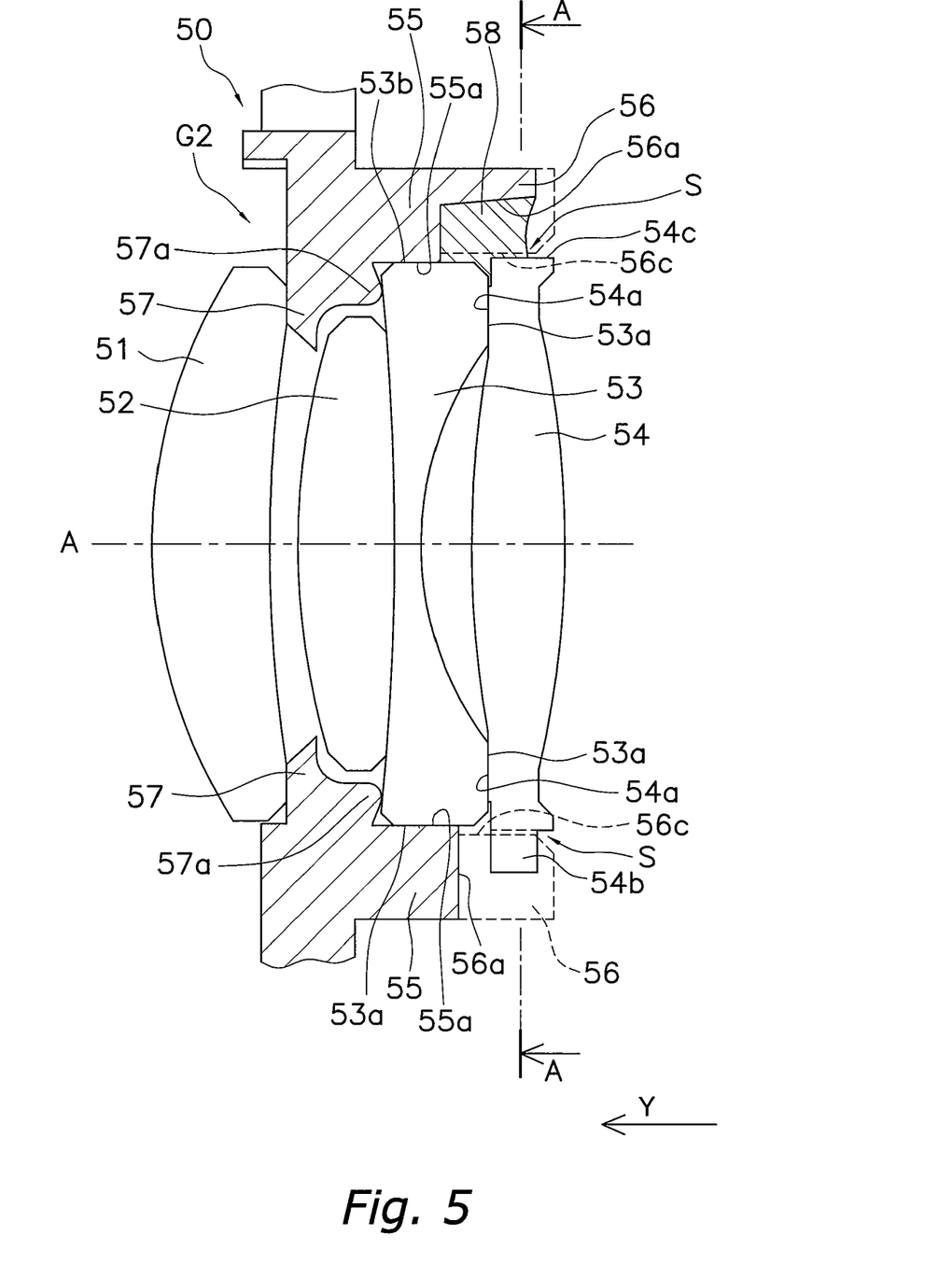
FIG. 5 is a schematic cross-sectional view of a second lens group and the surrounding area thereof.
Figure 6:
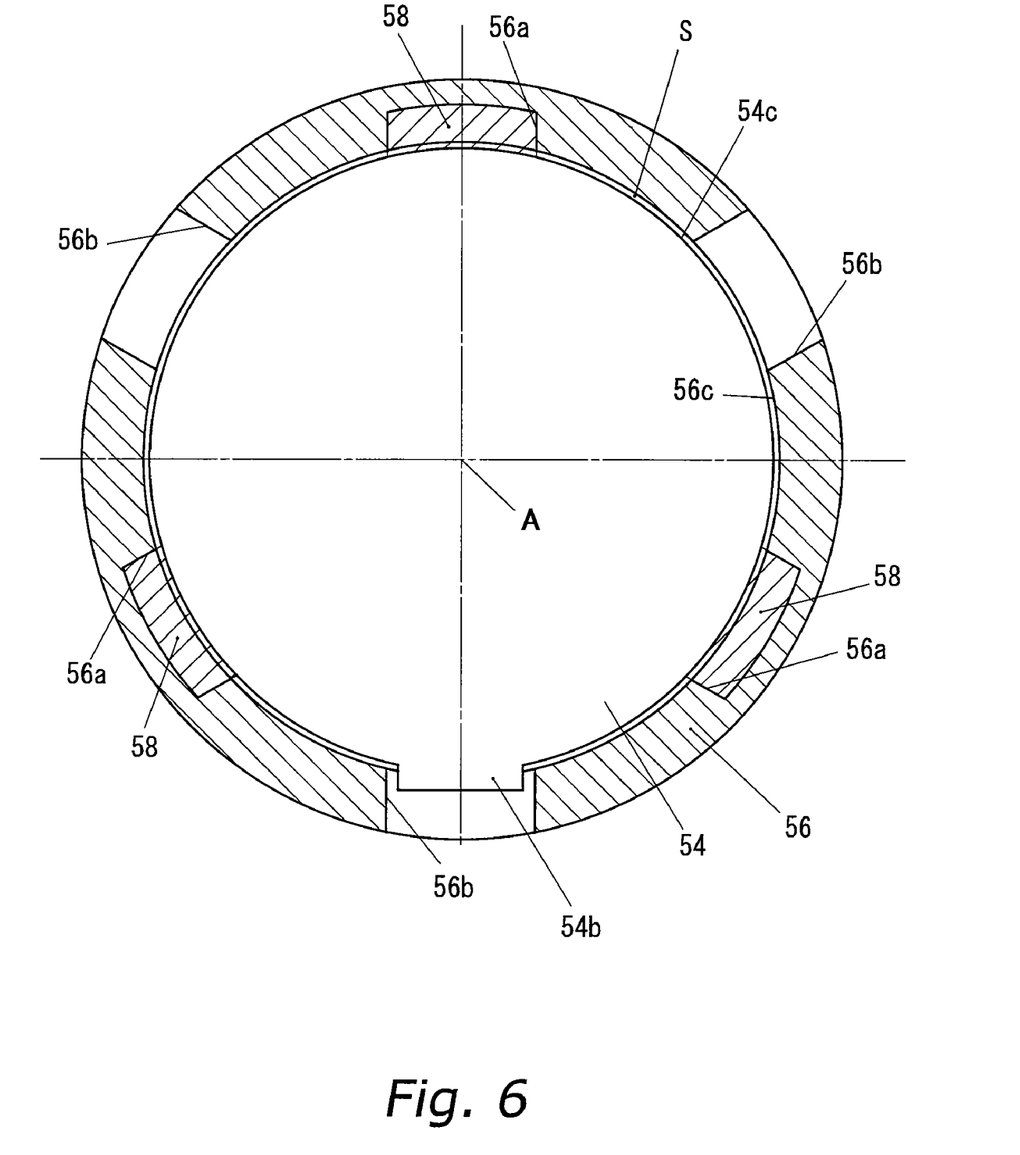
FIG. 6 is a schematic cross-sectional view of a second lens group and the surrounding area thereof.

This lens barrel 3 is characterized by its lens support structure. The lens support structure will now be described using the second lens group G2 as an example. FIG. 5 is a schematic cross sectional view of the second lens group G2 and the surrounding area thereof, and FIG. 6 is a cross sectional view along the A-A line in FIG. 5.

As shown in FIG. 5, the second lens group G2 includes a first lens 51, a second lens 52, a third lens 53 (serving as the first lens element), and a fourth lens 54 (serving as the second lens element).

The first lens 51 is a convex meniscus lens made of glass. The second lens 52 is a biconvex lens made of glass. The third lens 53 is a biconvex lens made of glass. The second lens 52 is joined to the lens face on the Y axis direction positive side of the third lens 53. The fourth lens 54 is a biconvex lens made of plastic. The outside diameter of the fourth lens 54 is larger than the outside diameter of the third lens 53. Since it is made of plastic, the fourth lens 54 is less rigid and has a larger coefficient of linear expansion than the third lens 53.

These lenses are fixed to various parts of the first frame 50 (serving as the support member). More specifically, as shown in FIGS. 5 and 6, the first frame 50 includes an annular first portion 55 that supports the third lens 53, a second portion 56 that supports the fourth lens 54 and is formed on the Y axis direction negative side of the first portion 55, and a third portion 57 that supports the first lens 51. The first lens 51 is fixed on the Y axis direction positive side of the third portion 57.

The first portion 55 is an annular portion that constitutes the main part of the first frame 50, and the third lens 53 is fitted via a tiny gap or press-fitted inside the inner periphery of the first portion 55. More specifically, in the case of press-fitting, the inside diameter of the first portion 55 is slightly smaller than the outside diameter of the third lens 53, and the first portion 55 pushes the third lens 53 to the inside in the radial direction. The inner peripheral face 55a of the first portion 55 comes into contact with the outer peripheral face 53b of the third lens 53. As a result, the third lens 53 is positioned in the radial direction relative to the first frame 50.

The annular third portion 57 extending radially inwardly is formed at the inner peripheral part on the Y axis direction positive side of the first portion 55. The third portion 57 has an annular contact part 57a that radially inwardly extends to the Y axis direction negative side. The contact part 57a comes into contact in the Y axis direction with the outer peripheral part of the third lens 53. As a result, the third lens 53 is positioned in the Y axis direction relative to the first frame 50, and the orientation (angle) of the third lens 53 relative to the optical axis A is stabilized.

The fourth lens 54 is disposed inside the inner periphery of the second portion 56. More specifically, a gap S is ensured in the radial direction between the inner peripheral face 56c of the second portion 56 and the outer peripheral face 54c of the fourth lens 54.

The fourth lens 54 is fixed by bonding to the second portion 56. More specifically, three bonding grooves 56a that are disposed at a constant pitch in the circumferential direction are formed in the second portion 56. At least two bonding grooves 56a may be formed in the second portion 56. Each of the bonding grooves 56a is filled with an adhesive agent 58, and the fourth lens 54 and the second portion 56 are bonded together by the adhesive agent 58. Specifically, the fourth lens 54 is fixed to the first frame 50 at three points by the adhesive agent 58. An example of the adhesive agent 58 is a UV curing adhesive agent that is cured by irradiation with ultraviolet rays.

The fourth lens 54 is in marginal contact with the third lens 53. More specifically, an annular contact face 53a that is perpendicular to the optical axis of the third lens 53 is formed on the Y axis direction negative side of the third lens 53. An annular contact face 54a that is perpendicular to the optical axis of the fourth lens 54 is formed on the Y axis direction positive side of the fourth lens 54. The contact faces 53a and 54a are disposed in a region that will not affect the optical performance of the second lens group G2. The contact face 54a of the fourth lens 54 comes into contact with the contact face 53a of the third lens 53. As a result, the fourth lens 54 is positioned in the Y axis direction relative to the third lens 53, and the orientation (angle) of the fourth lens 54 relative to the optical axis A is stabilized.

Furthermore, bonding grooves 56a extend to near the center in the Y axis direction of the third lens 53. Therefore, the outer peripheral part of the third lens 53 and the outer peripheral part of the fourth lens 54 are fixed to the second portion 56 by the adhesive agent 58. Also, the outer peripheral part of the fourth lens 54 is bonded to the outer peripheral part of the third lens 53 by the adhesive agent 58. This prevents the third lens 53 and the fourth lens 54 from shifting out of place relative to the first frame 50.

Also, the fourth lens 54 has a protrusion 54b that extends to the outside in the radial direction. The protrusion 54b may also be formed at a plurality of locations. Three cut-outs 56b are formed in the second portion 56. The cut-outs 56b are disposed between the bonding grooves 56a in the circumferential direction (rotational direction). The protrusion 54b is inserted via a gap in a cut-out 56b. The protrusion 54b also encompasses one created for manufacturing purposes. A possible example of the protrusion 54b is a gate used during the molding of a plastic lens.

With this lens support structure, the inside diameter of the first portion 55 is different from the inside diameter of the second portion 56. More specifically, the inside diameter of the first portion 55 is smaller than the inside diameter of the second portion 56. Therefore, the inside diameter of the first portion 55 and the inside diameter of the second portion 56 can be adjusted separately.

Examples of methods for adjusting the dimensions include adjusting the metal mold when the first frame 50 is produced by injection molding, and adjustment by machining when the first frame 50 is produced by mechanical working. As a result, this lens support structure can accommodate cases when the outside diameter of the third lens 53 is different from the outside diameter of the fourth lens 54.

Also, with this lens support structure, in adjusting the lenses 53 and 54 to be coaxial, it is possible to adjust only the inside diameter of the portions corresponding to the lenses 53 and 54. That is, with this lens support structure the lenses can be precisely adjusted to be coaxial, and degradation of optical performance can be prevented.

Because of the above, with this lens support structure, degradation of optical performance can be prevented while design freedom can be increased.

5. Operation of Digital Camera

The operation of the digital camera 1 will be described with reference to FIGS. 1 to 3.

5.1. When Power is Off

When the power switch 13 is in its off position, the lens barrel 3 is stopped in its retracted position (the state in which the lens barrel 3 is at its shortest in the Y axis direction), so that the lens barrel 3 will fit within the external dimensions of the outer case 2 in the Y axis direction.

5.2. When Power is On

When the power switch 13 is switched on, power is supplied to the various units, and the lens barrel 3 is driven from its retracted state to its image capture state. More specifically, the drive frame 34 is driven by the zoom motor 32 by a specific angle to the R1 side relative to the stationary frame 33. As a result, the drive frame 34 moves to the Y axis direction positive side relative to the stationary frame 33 while rotating relative to the stationary frame 33 according to the shape of the cam grooves 33c.

When the drive frame 34 rotates and moves straight relative to the stationary frame 33, the first lens frame 36 and the second lens frame 37 move along with the drive frame 34 to the Y axis direction positive side relative to the stationary frame 33. The first lens frame 36 and the second lens frame 37 do not rotate relative to the stationary frame 33 at this point.

The first lens frame 36 and the second lens frame 37 move along with the drive frame 34 to the Y axis direction positive side while moving in the Y axis direction relative to the drive frame 34 according to the shape of the first cam grooves 34c and the second cam grooves 34d. At this time the first lens frame 36 and the second lens frame 37 move relatively in the Y axis direction. Specifically, the first lens frame 36 and the second lens frame 37 move in the Y axis direction relative to the stationary frame 33 by an amount that is larger (or smaller) than the amount of movement of the drive frame 34 in the Y axis direction.

When the rotation of the drive frame 34 is stopped, movement of the first lens frame 36 and the second lens frame 37 in the Y axis direction also stops, and the lens barrel 3 is in its image capture state.

5.3. Zoom Operation During Image Capture

When the zoom adjustment lever 14 is operated to the telephoto side, the drive frame 34 is driven by the zoom motor 32 to the R1 side relative to the stationary frame 33, according to the rotational angle and operation duration of the zoom adjustment lever 14. As a result, the drive frame 34, the first lens frame 36, and the second lens frame 37 move together to the Y axis direction positive side relative to the stationary frame 33, and the zoom magnification of the imaging optical system O is increased.

When the zoom adjustment lever 14 is operated to the wide-angle side, the drive frame 34 is driven by the zoom motor 32 to the R2 side relative to the stationary frame 33, according to the rotational angle and operation duration of the zoom adjustment lever 14. As a result, the drive frame 34, the first lens frame 36, and the second lens frame 37 move together to the Y axis direction negative side relative to the stationary frame 33, and the zoom magnification of the imaging optical system O is decreased.

6. Characteristics

The digital camera 1 and the lens barrel 3 are characterized as follows.

6.1.

With this lens barrel 3, the gap S is formed in the radial direction between the plastic fourth lens 54 and the second portion 56 of the first frame 50 in the second lens group G2. Therefore, any change in the outside diameter of the fourth lens 54 brought about by temperature change is absorbed by the gap S, and there is no interference between the outer peripheral part of the fourth lens 54 and the second portion 56. Specifically, distortion of the fourth lens 54 caused by temperature change can be prevented, and degradation in optical performance can be avoided.

In addition, with this lens barrel 3 the inside diameter of the first portion 55 of the first frame 50 is smaller than the inside diameter of the second portion 56. Therefore, even if the outside diameter of the third lens 53 is different from the outside diameter of the fourth lens 54, the inside diameter of the first portion 55 and the inside diameter of the second portion 56 can be adjusted separately. Specifically, compared to a conventional lens support structure, dimensional precision of lens support portion can be higher, and degradation of optical performance can be prevented. Also, this lens support structure can accommodate cases when the outside diameter of the lenses 53 and 54 are different, which means that it affords greater design freedom.

The result of the above is that with this lens barrel 3, degradation of optical performance can be prevented while design freedom can be increased.

6.2.

With this lens barrel 3, the third lens 53 is fixed to the first frame 50 by the adhesive agent 58 that fills the three bonding grooves 56a. As a result, any change in the outside diameter of the fourth lens 54 brought about by temperature change is absorbed by the gap S, while the fourth lens 54 can be securely fixed to the first frame 50.

Also, the bonding grooves 56a extend to near the center of the outer peripheral part of the third lens 53, and the third lens 53 is fixed to the first frame 50 by the adhesive agent 58. Therefore, not only the fourth lens 54, but also the third lens 53 can be securely fixed to the first frame 50. Also, since common bonding grooves 56a are shared for the third lens 53 and the fourth lens 54, these two lenses can be bonded and fixed to the first frame 50 with a single adhesive filling operation.

Furthermore, the fourth lens 54 is fixed to the third lens 53 by the adhesive agent 58. Therefore, positional misalignment of the fourth lens 54 relative to the third lens 53 can be minimized.

6.3.

With this lens barrel 3, the outer peripheral part of the third lens 53 comes into contact in the Y axis direction with the contact part 57a. Therefore, the position of the third lens 53 in the Y axis direction is stabilized, and the position in which the fourth lens 54 comes into marginal contact with the third lens 53 in the Y axis direction is also stabilized.

6.4.

As discussed above, a lens barrel 3 having the above-mentioned lens support structure is installed in this digital camera 1. Therefore, degradation of optical performance can be prevented while greater design freedom is afforded.

7. Other Embodiments

The lens support structure, lens barrel, and camera according to the present invention are not limited to the embodiments discussed above, and various modifications and alterations are possible without departing from the gist of the present invention.

Figure 7A:
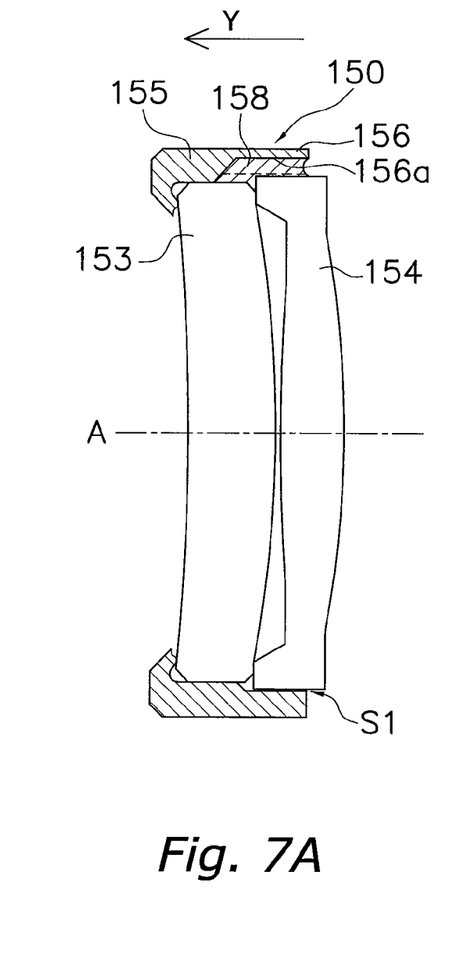
FIGS. 7A, 7B and 7C are schematic cross-sectional views of a second lens group and the surrounding area thereof (other embodiment)
Figure 7B:
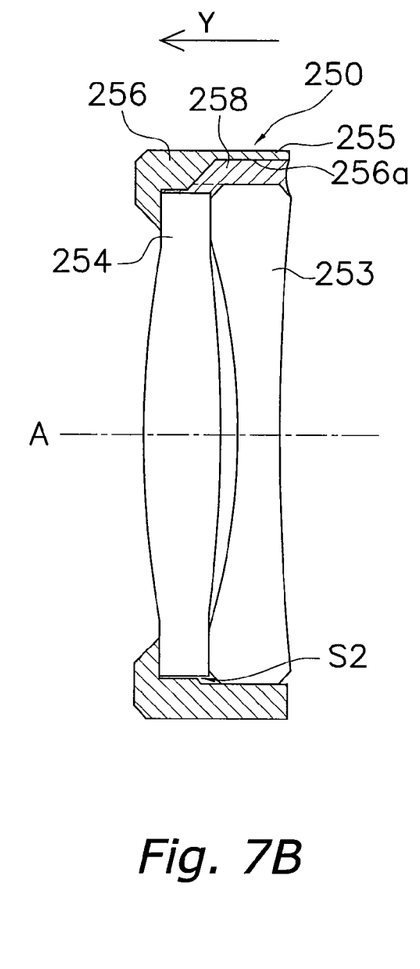
Figure 7C:
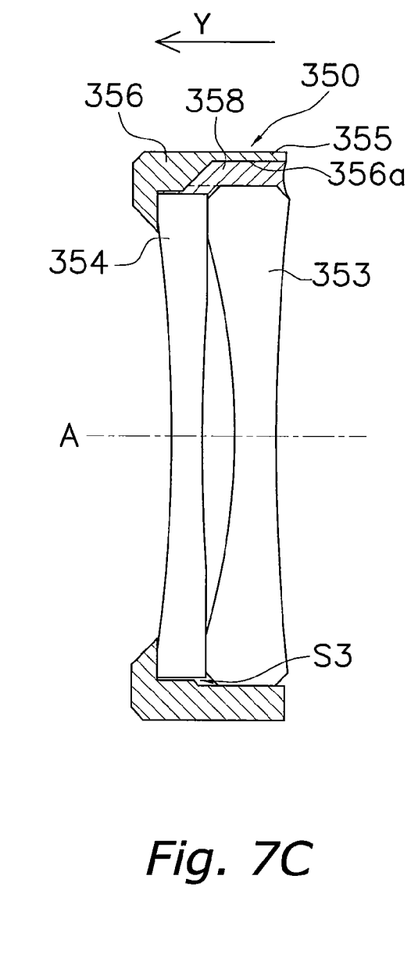
Figure 8A:
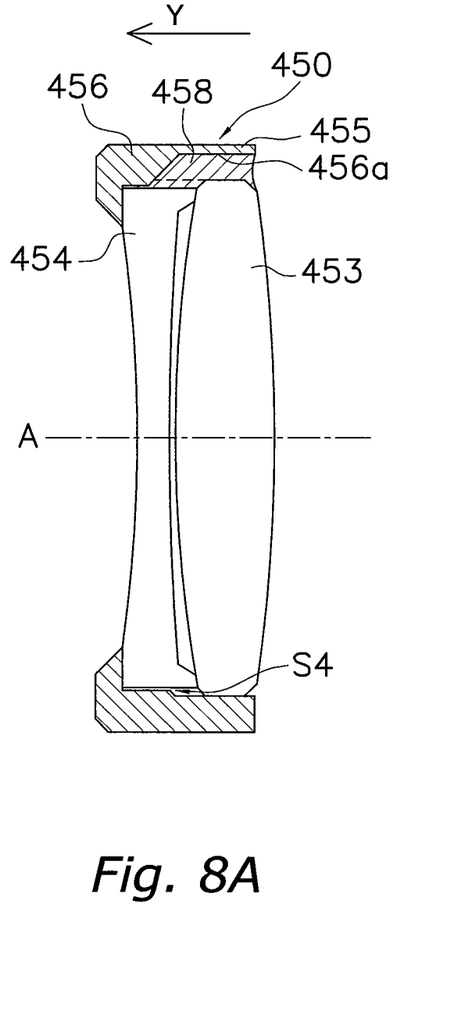
FIGS. 8A and 8B are schematic cross-sectional views of a second lens group and the surrounding area thereof (other embodiment).
Figure 8B:
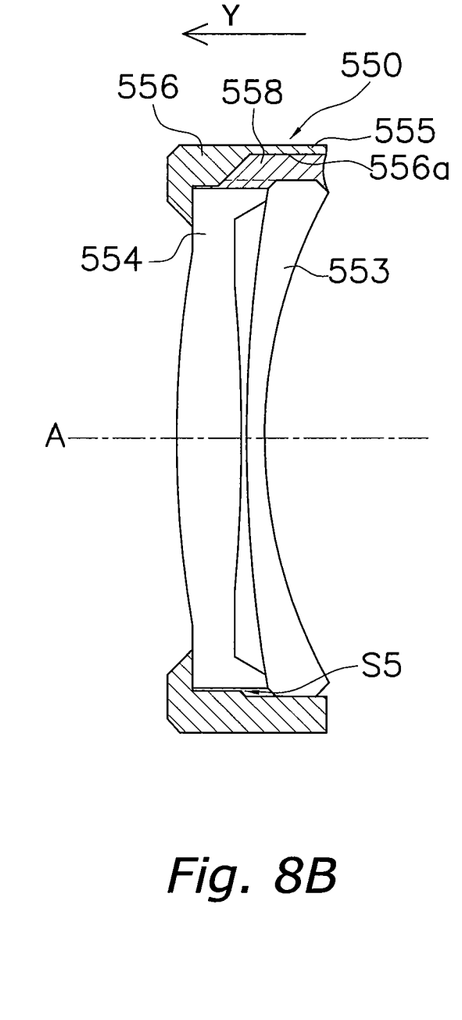

The lens support structure is not limited to the structure discussed above. For instance, the embodiments shown in FIGS. 7 and 8 are also possible. FIGS. 7 and 8 illustrate five lens support structures according to other embodiments. Furthermore, FIGS. 7 and 8 show only the structure around the above-mentioned third lens 53 and the fourth lens 54.

7.1.

With the lens support structure shown in FIG. 7A, a glass lens 153 is a convex meniscus lens, and is fitted via a tiny gap or press-fitted to a first portion 155 of a first frame 150. A plastic lens 154 is a biconvex lens, and is disposed inside the inner periphery of a second portion 156. Three bonding grooves 156a are formed in the second portion 156, and these bonding grooves 156a are filled with an adhesive agent 158.

The outside diameter of the glass lens 153 is smaller than the outside diameter of the plastic lens 154. The inside diameter of the first portion 155 is smaller than the inside diameter of the second portion 156. A gap S1 is ensured in the radial direction between the plastic lens 154 and the second portion 156.

In this case, just as with the above embodiments, any change in the outside diameter of the plastic lens 154 brought about by temperature change is absorbed by the gap S1. Also, since the inside diameter of the first portion 155 is different from the inside diameter of the second portion 156, the inside diameters of the first portion 155 and the second portion 156 can be adjusted separately, greater design freedom is afforded, and the dimensional precision of the lens support portions can be increased.

The result of the above is that with this lens support structure, degradation of optical performance is prevented while greater design freedom is afforded.

7.2.

With the lens support structure shown in FIG. 7B, the disposition of the glass lens and the plastic lens is reversed as compared to that in the above embodiments. More specifically, a plastic lens 254 is a biconvex lens, and is disposed inside the inner periphery of a second portion 256 of a first frame 250. A glass lens 253 is a biconcave lens, and is fitted via a tiny gap or press-fitted to a first portion 255. Three bonding grooves 256a are formed in the first portion 255, and the bonding grooves 256a are filled with an adhesive agent 258.

The outside diameter of the plastic lens 254 is smaller than the outside diameter of the glass lens 253. The inside diameter of the second portion 256 is smaller than the inside diameter of the first portion 255. A gap S2 is ensured in the radial direction between the plastic lens 254 and the second portion 256.

Here again, just as with the above embodiments, a change in the outside diameter of the plastic lens 254 is absorbed by the gap S2. Also, since the inside diameter of the first portion 255 is different from the inside diameter of the second portion 256, the inside diameters of the first portion 255 and the second portion 256 can be adjusted separately, greater design freedom is afforded, and the dimensional precision of the lens support portions can be increased.

The result of the above is that with this lens support structure, degradation of optical performance is prevented while greater design freedom is afforded.

7.3.

With the lens support structure shown in FIG. 7C, a plastic lens 354 is a biconcave lens, and is disposed inside the inner periphery of a second portion 356 of a first frame 350. A glass lens 353 is a biconcave lens, and is fitted via a tiny gap or press-fitted to a first portion 355. Three bonding grooves 356a are formed in the first portion 355, and the bonding grooves 356a are filled with an adhesive agent 358.

The outside diameter of the plastic lens 354 is smaller than the outside diameter of the glass lens 353. The inside diameter of the second portion 356 is smaller than the inside diameter of the first portion 355. A gap S3 is ensured in the radial direction between the plastic lens 354 and the second portion 356.

Here again, just as with the above embodiments, a change in the outside diameter of the plastic lens 354 is absorbed by the gap S3. Also, since the inside diameter of the first portion 355 is different from the inside diameter of the second portion 356, the inside diameters of the first portion 355 and the second portion 356 can be adjusted separately, greater design freedom is afforded, and the dimensional precision of the lens support portions can be increased.

The result of the above is that with this lens support structure, degradation of optical performance is prevented while greater design freedom is afforded.

7.4.

With the lens support structure shown in FIG. 8A, a plastic lens 454 is a biconcave lens, and is disposed inside the inner periphery of a second portion 456 of a first frame 450. A glass lens 453 is a biconvex lens, and is fitted via a tiny gap or press-fitted to a first portion 455. Three bonding grooves 456a are formed in the first portion 455, and the bonding grooves 456a are filled with an adhesive agent 458.

The outside diameter of the plastic lens 454 is smaller than the outside diameter of the glass lens 453. The inside diameter of the second portion 456 is smaller than the inside diameter of the first portion 455. A gap S4 is ensured in the radial direction between the plastic lens 454 and the second portion 456.

Here again, just as with the above embodiments, a change in the outside diameter of the plastic lens 454 is absorbed by the gap S4. Also, since the inside diameter of the first portion 455 is different from the inside diameter of the second portion 456, the inside diameters of the first portion 455 and the second portion 456 can be adjusted separately, greater design freedom is afforded, and the dimensional precision of the lens support portions can be increased.

The result of the above is that with this lens support structure, degradation of optical performance is prevented while greater design freedom is afforded.

7.5.

With the lens support structure shown in FIG. 8B, a plastic lens 554 is a biconvex lens, and is disposed inside the inner periphery of a second portion 556 of a first frame 550. A glass lens 553 is a concave meniscus lens, and is fitted via a tiny gap or press-fitted to a first portion 555. Three bonding grooves 556a are formed in the first portion 555, and the bonding grooves 556a are filled with an adhesive agent 558.

The outside diameter of the plastic lens 554 is smaller than the outside diameter of the glass lens 553. The inside diameter of the second portion 556 is smaller than the inside diameter of the first portion 555. A gap S5 is ensured in the radial direction between the plastic lens 554 and the second portion 556.

Here again, just as with the above embodiments, a change in the outside diameter of the plastic lens 554 is absorbed by the gap S5. Also, since the inside diameter of the first portion 555 is different from the inside diameter of the second portion 556, the inside diameters of the first portion 555 and the second portion 556 can be adjusted separately, greater design freedom is afforded, and the dimensional precision of the lens support portions can be increased.

The result of the above is that with this lens support structure, degradation of optical performance is prevented while greater design freedom is afforded.

7.6.

Conceivable devices in which the above-mentioned lens barrel 3 is installed include digital cameras that allow moving or still pictures to be captured, film cameras that make use of silver halide film, and so forth. In any case, the effect will be the same as that in the embodiments given above.

GENERAL INTERPRETATION OF TERMS

In understanding the scope of the present invention, the term "configured" as used herein to describe a component, section or part of a device includes hardware and/or software that is constructed and/or programmed to carry out the desired function.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

Terms that are expressed as "means-plus function" in the claims should include any structure that can be utilized to carry out the function of that part of the present invention. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A lens support structure, comprising:
   a first lens element;
   a second lens element made of a different material from that of the first lens element;
   a support member supporting the first lens element and second lens element and having a first portion to which the first lens element is fitted and a second portion where the second lens element is disposed inside the inner periphery thereof; and an adhesive agent for fixing the second lens element to the support member, wherein the second lens element has lower stiffness than the first lens element, or has a larger coefficient of linear expansion than the first lens element, a gap is formed between the second lens element and the second portion in the radial direction, and the inside diameter of the first portion is different from the inside diameter of the second portion.

2. The lens support structure according to claim 1, wherein the outer peripheral part of the second lens element comes into contact with the outer peripheral part of the first lens element in the direction along an optical axis thereof.

3. The lens support structure according to claim 2, wherein the support member has at least one bonding groove formed on the inner peripheral part of the second portion and extending in the direction along the optical axis of the second lens element.

4. The lens support structure according to claim 3, wherein the bonding groove extends in the direction along the optical axis up to the inner peripheral part of the first portion.

5. The lens support structure according to claim 4, wherein the first portion presses the outer peripheral part of the first lens element to the inside in the radial direction.

6. The lens support structure according to claim 5, wherein the support member has a contact part formed to extend radially inwardly from either the first or second portion, and where the outer peripheral part of the first or second portion comes into contact in the direction along the optical axis.

7. A lens barrel for supporting an imaging optical system, comprising:

the lens support structure according to claim 6; and a support frame for supporting the support member rotatably around the optical axis of the imaging optical system and movably in the direction along the optical axis.

8. A camera, comprising:

the lens barrel according to claim 7;

an imaging optical system supported by the lens barrel; and an outer case for supporting the lens barrel.

9. The lens support structure according to claim 2, wherein the first portion presses the outer peripheral part of the first lens element to the inside in the radial direction.

10. The lens support structure according to claim 9, wherein the support member has a contact part formed to extend radially inwardly from either the first or second portion, and where the outer peripheral part of the first or second portion comes into contact in the direction along the optical axis.

11. The lens support structure according to claim 2, wherein the support member has a contact part formed to extend radially inwardly from either the first or second portion, and where the outer peripheral part of the first or second portion comes into contact in the direction along the optical axis.

12. The lens support structure according to claim 3, wherein the first portion presses the outer peripheral part of the first lens element to the inside in the radial direction.

13. The lens support structure according to claim 12, wherein the support member has a contact part formed to extend radially inwardly from either the first or second portion, and where the outer peripheral part of the first or second portion comes into contact in the direction along the optical axis.

14. The lens support structure according to claim 1, wherein the support member has at least one bonding groove formed on the inner peripheral part of the second portion and extending in the direction along the optical axis of the second lens element, and the bonding groove is filled with the adhesive agent.

15. The lens support structure according to claim 14, wherein the bonding groove extends in the direction along the optical axis up to the inner peripheral part of the first portion.

16. The lens support structure according to claim 15, wherein the first portion presses the outer peripheral part of the first lens element to the inside in the radial direction.

17. The lens support structure according to claim 16, wherein the support member has a contact part formed to extend radially inwardly from either the first or second portion, and where the outer peripheral part of the first or second portion comes into contact in the direction along the optical axis.

18. The lens support structure according to claim 1, wherein the first portion presses the outer peripheral part of the first lens element to the inside in the radial direction.

19. The lens support structure according to claim 18, wherein the support member has a contact part formed to extend radially inwardly either the first or second portion, and where the outer peripheral part of the first or second portion comes into contact in the direction along the optical axis.

20. The lens support structure according to claim 1, wherein the support member has a contact part formed to extend radially inwardly from either the first or second portion, and where the outer peripheral part of the first or second portion comes into contact in the direction along the optical axis.

* * * * *